United States Patent
Baek

(10) Patent No.: US 7,589,931 B2
(45) Date of Patent: *Sep. 15, 2009

(54) METHOD, APPARATUS, AND STORAGE MEDIUM FOR CONTROLLING TRACK SEEK SERVO IN DISK DRIVE, AND DISK DRIVE USING SAME

(75) Inventor: Sang-eun Baek, Incheon (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 29 days.

This patent is subject to a terminal disclaimer.

(21) Appl. No.: 11/704,284

(22) Filed: Feb. 9, 2007

(65) Prior Publication Data

US 2007/0183082 A1 Aug. 9, 2007

(30) Foreign Application Priority Data

Feb. 9, 2006 (KR) .................. 10-2006-0012600

(51) Int. Cl.
G11B 5/596 (2006.01)
(52) U.S. Cl. .................. 360/78.06; 360/78.09; 318/560
(58) Field of Classification Search ............ None
See application file for complete search history.

(56) References Cited

U.S. PATENT DOCUMENTS

| 4,937,689 | A | * | 6/1990 | Seaver et al. ............. 360/78.07 |
| 5,469,414 | A | * | 11/1995 | Okamura ................. 360/78.06 |
| 6,570,733 | B1 | | 5/2003 | Waugh et al. |
| 6,704,159 | B2 | | 3/2004 | Ding |
| 7,359,140 | B2 | * | 4/2008 | Chung ..................... 360/78.06 |
| 2002/0054450 | A1 | * | 5/2002 | Chu et al. ................. 360/78.06 |
| 2003/0095354 | A1 | | 5/2003 | Atsumi et al. |
| 2004/0066158 | A1 | * | 4/2004 | Naik ......................... 318/276 |
| 2004/0070863 | A1 | * | 4/2004 | Guo et al. ................. 360/78.06 |
| 2005/0141131 | A1 | | 6/2005 | Schmidt et al. |
| 2006/0082922 | A1 | * | 4/2006 | Shih ........................ 360/78.06 |
| 2007/0268618 | A1 | * | 11/2007 | Liu et al. ................. 360/78.04 |

FOREIGN PATENT DOCUMENTS

KR 1020040099527 A 12/2004

* cited by examiner

*Primary Examiner*—Andrew L Sniezek
(74) *Attorney, Agent, or Firm*—Volentine & Whitt, PLLC

(57) ABSTRACT

Provided are a method, apparatus, and storage medium for controlling a track seek servo in a disk drive. Thus, a transducer is moved to a target track using a transformed Proximate-Time Optimal Servo (PTOS) velocity trajectory in which an acceleration duration is symmetrical to a deceleration duration in a track seek mode.

26 Claims, 5 Drawing Sheets

# METHOD, APPARATUS, AND STORAGE MEDIUM FOR CONTROLLING TRACK SEEK SERVO IN DISK DRIVE, AND DISK DRIVE USING SAME

BACKGROUND OF THE INVENTION

1. Field of the Invention

The present invention relates to a method, apparatus, and storage medium for controlling a disk drive. More particularly, the invention relates to a method, apparatus, and storage medium for controlling a track seek servo in a disk drive.

This application claims the benefit of Korean Patent Application No. 10-2006-0012600, filed on Feb. 9, 2006, the subject matter of which is hereby incorporated by reference.

2. Description of the Related Art

A hard disk drive (HDD) includes a plurality of magnetic transducers, often referred to as "read/write heads", adapted to read data from and/or write data to one or more rotating disks. (Hereafter, only a single "disk" will be described, bearing in mind that multiple disks or disk surfaces might be used). Read operations are generally accomplished by sensing a magnetic field associated with the surface of the disk. Write operations are generally accomplished by selectively magnetizing the surface of the disk. Data is written (i.e., recorded) in a plurality of sectors respectively included in concentric tracks designated on the surface of the disk. Each disk track is identified by a unique number. Tracks having the same number form a cylinder around the disk. Thus, each track may be further defined using a cylinder number.

Each read/write head is typically mounted on a slider combined with a head gimbal assembly (HGA). Each HGA is attached to an actuator arm. The actuator arm is operatively combined with a voice coil adjacently located to a magnetic assembly. The voice coil and the magnetic assembly forming a voice coil motor (VCM). The HDD typically includes a driving circuit supplying drive current to run the VCM, and a related controller. As driven by the applied current, the VCM rotates the actuator arm to move the read/write head over the surface of the disk.

During read/write operations, the HDD may perform a seek routine moving a read/write head from one cylinder to another. During the seek routine, the VCM controls movement of the read/write head to position it over a new cylinder location above the surface of the disk. During this operation, the controller performs a servo control routine ensuring that the read/write head moves to a correct cylinder location and track center.

It is clearly preferable to minimize the amount of time needed to read data from or write data to the disk. Thus, during a seek routine, each read/write head must be moved to a new cylinder location within the shortest reasonable time period. This design objective requires that stabilization of the HGA be performed in a minimum of time.

In general, to quickly move a read/write head to a target track, a seek servo control routine is performed using a rectangular acceleration trajectory. However, the square wave control signal used in this approach often includes a harmonic high frequency wave component which may cause mechanical resonance in the HGA. Such mechanical vibration may cause the mechanical components and/or assemblies to vibrate at a corresponding high natural frequency. This outcome produces acoustic noise, generates an undesirable vibration, and extends the time requires to achieve HGA stabilization. The mechanical resonance potentially generated by the conventional square wave control signal, thus, increases the total time (including stabilization time) required to read data from and/or write data to the disk.

In light of this problem, a seek control technique using a sinusoidal acceleration trajectory has been developed. However, although the seek control technique using a sinusoidal acceleration trajectory significantly reduces noise and vibration, the seek control technique also requires a complex algorithm to calculate the acceleration trajectory. Execution of this complex algorithm requires a great deal of time and adversely extends the time required to execute read/write operations.

SUMMARY OF THE INVENTION

Embodiments of the invention provide a method, apparatus, and storage medium for controlling a track seek servo in a disk drive in order to reduce the calculation time required to generate an acceleration trajectory having suppressed control signal waveform variations over a period of time including a transition point between acceleration and deceleration durations.

In one embodiment, the invention comprises a method of controlling a track seek servo in a Hard Disk Drive (HDD), comprising; using a transformed Proximate-Time Optimal Servo (PTOS) velocity trajectory having symmetrical acceleration and deceleration durations during a track seek mode of operation, and applying the transformed Proximate-Time Optimal Servo (PTOS) velocity trajectory to the control of the movement of a read/write head from a current track to a target track.

In another embodiment, the invention provides an apparatus for controlling a track seek servo in a Hard Disk Drive (HDD), comprising; a seek trajectory generator adapted to generate a transformed Proximate-Time Optimal Servo (PTOS) velocity trajectory V_profile in which an acceleration duration is symmetrical to a deceleration duration in a track seek mode and further adapted to calculate a designed position value and a designed velocity value using the transformed PTOS velocity trajectory, a state estimator adapted to determine a real position value and a real velocity value for a read/write head moving over the surface of a disk in the HDD, a first subtracter adapted to output a value obtained by subtracting the real position value from the designed position value, a position control gain compensator adapted to generate a position compensation value by multiplying the output value of the first subtracter by a predetermined position gain, a second subtracter adapted to output a value obtained by subtracting the real velocity value from a value obtained by adding the position compensation value to the designed velocity value, a velocity control gain compensator adapted to generate a velocity compensation value by multiplying the output value of the second subtracter by a predetermined velocity gain, and an actuator adapted to vary drive current supplied to a voice coil in the HDD in accordance with the velocity compensation value.

In another embodiment, the invention provides a disk drive comprising; a disk adapted to store data, a spindle motor rotating the disk, a read/write head adapted to read data from and/or write data to the disk, an actuator adapted to move the transducer over the surface of the disk, and a controller adapted to control movement of the read/write head from a current track to a target track in relation to a transformed Proximate-Time Optimal Servo (PTOS) velocity trajectory having symmetrical acceleration and deceleration durations in a track seek mode.

In another embodiment, the invention provides recording medium storing code segments executable on a controller to implement a method of controlling a track seek servo in a Hard Disk Drive (HDD), the method comprising; using a transformed Proximate-Time Optimal Servo (PTOS) velocity trajectory having symmetrical acceleration and deceleration durations during a track seek mode of operation, and applying the transformed Proximate-Time Optimal Servo (PTOS) velocity trajectory to the control of the movement of a read/write head from a current track to a target track.

DESCRIPTION OF EMBODIMENTS

In general, the purpose of a track seek servo in a disk drive is to quickly move a read/write head (hereafter, "head") to a desired position while minimizing noise and vibration. A so-called "bang-bang" seek controller using a rectangular acceleration trajectory is most advantageous in attempts to minimize a seek time, but, as noted above, has low performance regarding the potential to induce noise and vibration. In contrast, a sinusoidal seek controller using a sinusoidal acceleration trajectory is advantageous regarding noise and vibration, but less effective in minimizing the seek time suffers from current consumption problems. Compared to the bang-bang seek controller, the sinusoidal seek controller has a 10% longer seek time due to its use of a more complex algorithm to calculate its velocity trajectory.

Embodiments of the present invention make use of a new velocity trajectory having suppressed rapid variations otherwise associated with a control signal applied to the sinusoidal seek controller. Embodiments of the invention also use a new seek control method adapted to reduce the time required to calculate a seek trajectory. Thus, in one aspect, embodiments of the invention generate a seek trajectory using more simple algorithm and do while generating a seek trajectory having a reduced potential for subsequently generating noise and vibration.

In one embodiment, these results are obtained by use of a new seek trajectory is generated by combining a Proximate-Time Optimal Servo (PTOS) velocity trajectory and a sinusoidal velocity trajectory.

As a threshold matter, an untransformed PTOS velocity trajectory, V_ptos, may be obtained using Equation 1.

$$V\_ptos = \alpha * \{\beta * \log(1 - ttg/\beta) + ttg\} \quad (1)$$

Here, $\alpha = R*Ja/Kt^2$, $\beta = -Imax*R/Kt$, where R denotes the resistance of a constituent voice coil, Ja denotes an inertia value of an actuator, Kt denotes a torque constant, Imax denotes a maximum current value applied to a VCM, and ttg denotes a seek distance (i.e., a moving distance).

Figure 4:
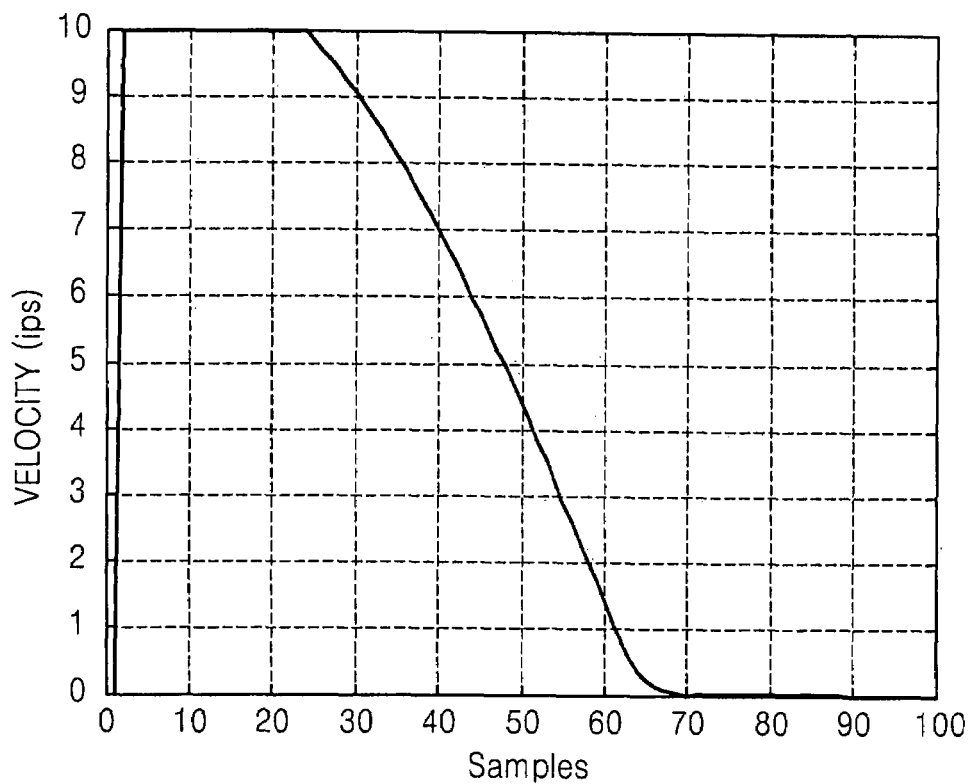
FIG. 4 is a diagram illustrating a PTOS velocity trajectory related to the present invention.

One example of a PTOS velocity trajectory V_ptos calculated according to Equation 1 is illustrated in FIG. 4. As may be seem from FIG. 4, the PTOS velocity trajectory contains rapid velocity variations that may cause noise and vibrations. In order to reduce (or minimize) these variations, a new velocity trajectory is generated by transforming the PTOS velocity trajectory V_ptos in a manner described below.

Figure 5:
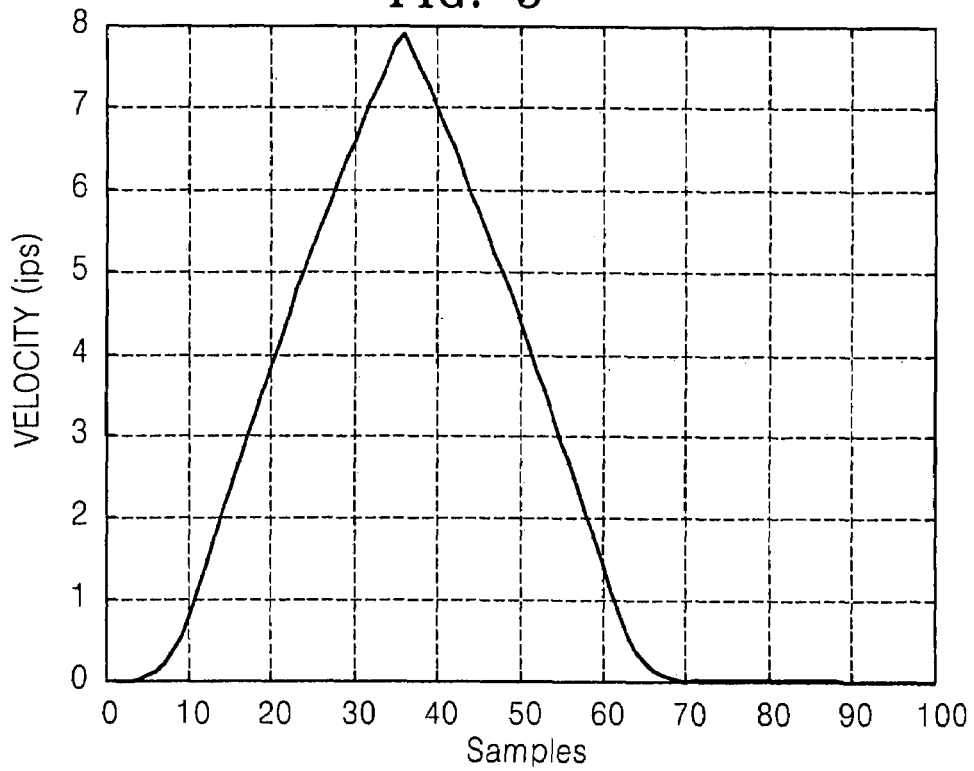
FIG. 5 is a diagram illustrating a PTOS symmetrical velocity trajectory for generating a new velocity trajectory according to an embodiment of the present invention.

The velocity trajectory illustrated in FIG. 5 may be obtained by transforming the PTOS velocity trajectory V_ptos such that its acceleration duration and deceleration duration are symmetrical, and in one embodiment equal to one-half the seek distance, sk_len/2. A peak velocity value, Vpeak, found at one-half the seek distance sk_len/2 can be obtained from the PTOS velocity trajectory V_ptos of Equation 1. (See, e.g., the peak velocity value Vpeak of 8 inch/sec in FIG. 5).

Comparing the velocity trajectories illustrated in FIGS. 4 and 5, the rapid velocity variations have been significantly improved except for the variation manifest at the transition point between the acceleration and deceleration durations.

Thus, in embodiments the present invention, the foregoing velocity trajectory must be transformed into a "smoothed velocity curve" having less severe velocity variations across its entire interval, including the period having the transition point between the acceleration and deceleration durations.

In order to accomplish this smoothing function, a threshold Vth is first determined. This threshold is used to determine the extent of the interval during which the velocity trajectory will be transformed to a smoothed curve around the transition point between the acceleration and deceleration durations. For example, the threshold Vth may be determined as a velocity corresponding to 80% of the peak velocity value Vpeak manifest at one-half the seek distance sk_len/2, (i.e., Vth=0.8*Vpeak).

Then, the maximum velocity V max in the curve duration is determined. For example, the maximum velocity V max can be determined as V max=0.5*(Vpeak−Vth).

In the present invention, a sine function is used to generate a velocity trajectory in the curve duration. That is, the velocity trajectory in the curve duration, V sin=V max*sin(n*180/Nsample).

Here, the sine function uses a range of from 0 to 180°, and Nsample denotes a sine function over the interval between 0 and 180°. Accordingly, the bigger the Nsample, the narrower the sine function interval, and the smaller the Nsample, the wider the sine function interval. Thus, Nsample is used to adjust an interval for transforming the velocity trajectory to a curve according to a seek distance, and Nsample may be large when the seek distance is long and small when the seek distance is short.

Based on the above description, when it is assumed that a current seek velocity is Vcurr and a current seek point is sk_curr, a new velocity trajectory V_profile according to an embodiment of the invention is obtained according to intervals as described below:

For intervals where Vcurr<Vth and sk_curr<sk_len/2,

V_profile=symmetrical velocity trajectory of PTOS.

That is, V_profile=$\alpha*\{\beta*\log(1-tta/\beta)+tta\}$, where tta denotes a distance moved by performing a seek operation. In contrast:

For an interval where Vcurr≧Vth,

V_profile=$Vth+V$ sin.

For intervals where Vcurr<Vth and sk_curr>sk_len/2,

V_profile=velocity trajectory of PTOS.

That is, V_profile=$\alpha*\{\beta*\log(1-ttg/\beta)+ttg\}$, where ttg demotes a seek distance (i.e., a moving distance)

Figure 6:
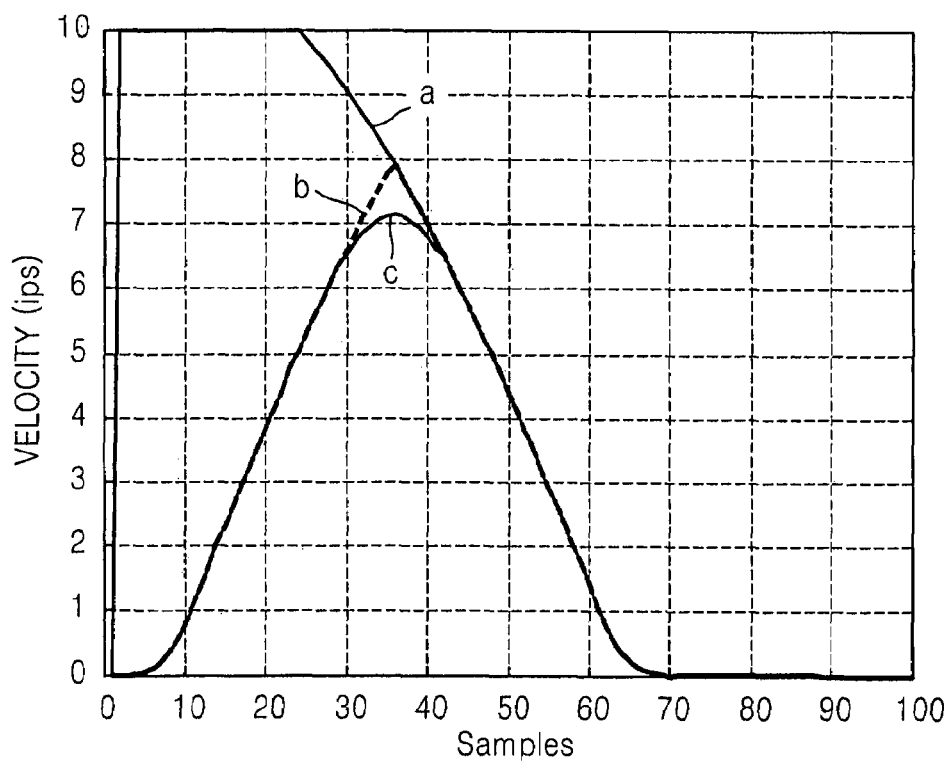
FIG. 6 is a diagram showing the PTOS velocity trajectory, the PTOS symmetrical velocity trajectory, and the new velocity trajectory for explaining a method of generating the new velocity trajectory according to an embodiment of the present invention.

In FIG. 6, a velocity trajectory b may be obtained by applying a trajectory symmetrical to a velocity trajectory a in the deceleration duration of the PTOS velocity trajectory at sk_len/2 to the acceleration duration, and a velocity trajectory c, which is the object according to an embodiment of the present invention, can be obtained by applying a sinusoidal velocity trajectory to the duration in which the seek velocity is greater than Vth (e.g., 6 ips in FIG. 6).

Figure 7:
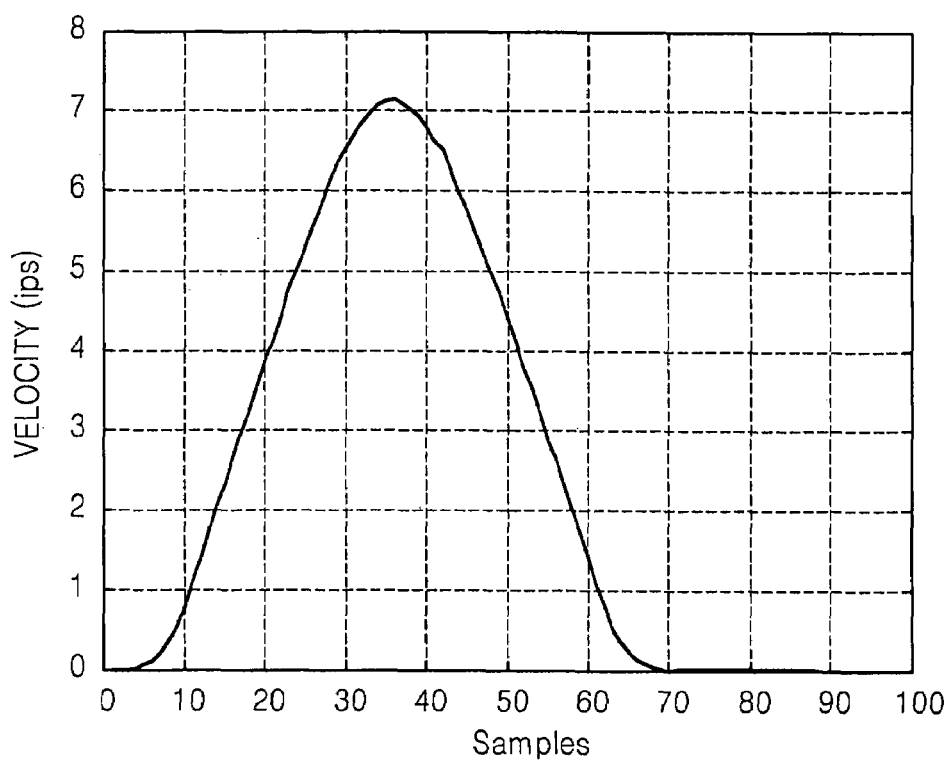
FIG. 7 is a diagram showing the new velocity trajectory according to an embodiment of the present invention.

FIG. 7 shows only the new velocity trajectory V_profile according to an embodiment of the present invention. The velocity trajectory illustrated in FIG. 7 significantly reduces the rapid velocity variation at the transition point, as compared with the PTOS velocity trajectory illustrated in FIG. 4, and a calculation time compared to the sinusoidal velocity trajectory.

An apparatus for controlling a track seek servo in a disk drive, which performs a seek control using the velocity trajectory generated based on the above-described technique, will now be described.

First of all, an HDD to which the present invention is applied will now be described with respect to FIG. 1.

Figure 1:
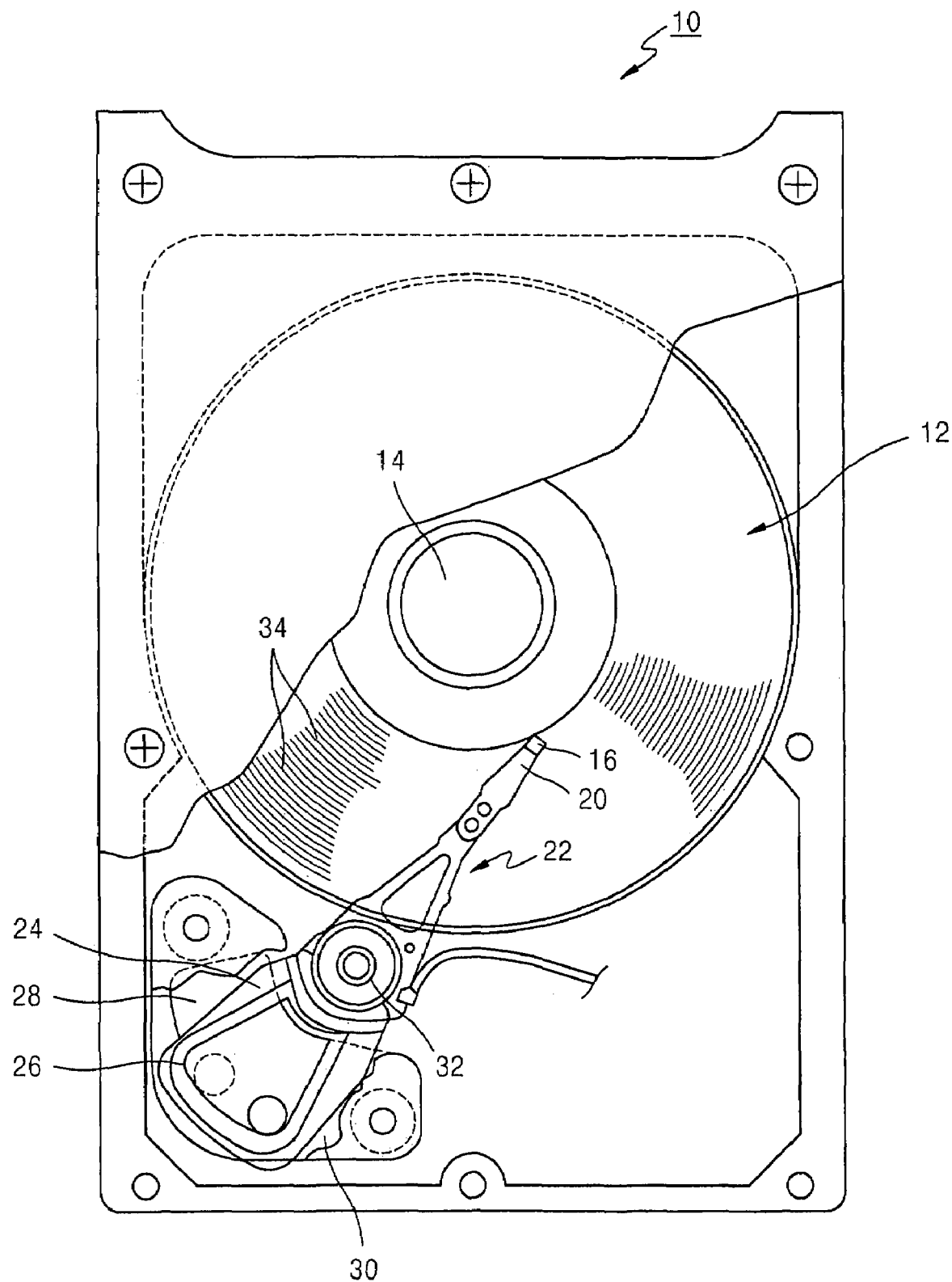
FIG. 1 is a plan view of an HDD according to an embodiment of the present invention.

FIG. 1 is a plan view of an HDD 10 according to an embodiment of the present invention. Referring to FIG. 1, HDD 10 includes at least one magnetic disk 12 rotated by a spindle motor 14. HDD 10 also includes at least one head 16 adapted to move above the recording surface of disk 12.

Head 16 may read data from and/or write data to rotating disk 12 by sensing a magnetic field on the surface of disk 12 or magnetizing the surface of disk 12. Though a single head 16 is shown in FIG. 1, it may include both a write head for magnetizing disk 12 and a separate read head for sensing a magnetic field associated with disk 12. In one embodiment, the read head may be a magneto-resistive (MR) component.

Head 16 is be mounted on a slider 20. Slider 20 generates an air bearing between head 16 and the surface of disk 12, as disk 12 rotates. Slider 20 is combined with a head gimbal assembly (HGA) 22. HGA 22 is attached to an actuator arm 24 having a voice coil 26. Voice coil 26 is located adjacent to a magnetic assembly 28 to define a voice coil motor (VCM) 30. Drive current supplied to voice coil 26 generates a mechanical torque that rotates actuator arm 24 around a bearing assembly 32. The rotation of actuator arm 24 moves head 16 over the surface of disk 12.

Data is typically stored in concentric tracks 34 around disk 12. In general, each track 34 includes a plurality of sectors. Each sector includes a data field and an identification field. The identification field is composed of gray code identifying sectors and tracks (cylinders). Head 16 moves over the surface of disk 12 to read or write data from a designated track.

Operation of a general electrical system associated with HDD 10 will now be described with reference to the block diagram of FIG. 2. Electrical system 40 is adapted to control the operation of HDD 10 according to an embodiment of the invention.

Figure 2:
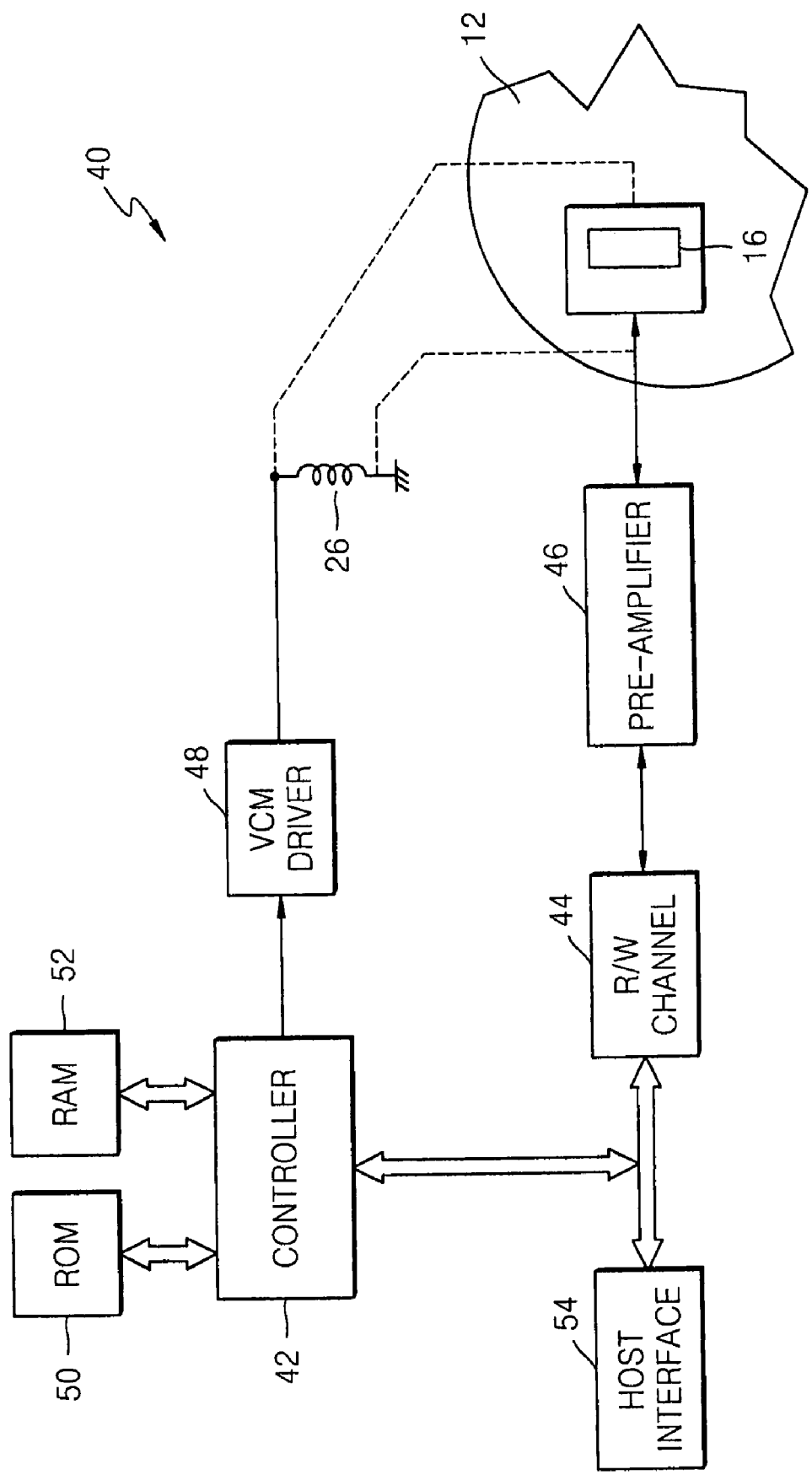
FIG. 2 is a block diagram of an electrical system controlling an HDD according to an embodiment of the present invention.

Referring to FIG. 2, electrical system 40 includes a controller 42 connected to head 16 through a read/write (R/W) channel circuit 44 and a pre-amplifier 46. Controller 42 may be implemented using a conventional digital signal processor (DSP), a microprocessor, or a micro-controller. Controller 42 provides a control signal to R/W channel circuit 44 during read/write operations. Data is typically communicated from R/W channel circuit 44 to a host interface circuit 54. Host interface circuit 54 includes a buffer memory (not shown) available to HDD 10 and an associated control circuit (not shown) interfacing with a host device, such as a personal computer (PC).

Controller 42 is also connected to a VCM driver 48 supplying a driving current to voice coil 26. Controller 42 provides a control signal to VCM driver 48 to control the excitation of VCM 30 and the movement of head 16.

Controller 42 is also connected to a nonvolatile memory, such as a read only memory (ROM) 50 or a flash memory, and a random access memory (RAM) 52. Memories 50 and/or 52 are adapted to store instructions and data, which may be used by controller 42 to execute software routines. For example, one software routine might define and control a seek routine moving head 16 from one track to another. The seek routine includes a servo control routine for ensuring that head 16 is properly moved over a target track.

Figure 3:
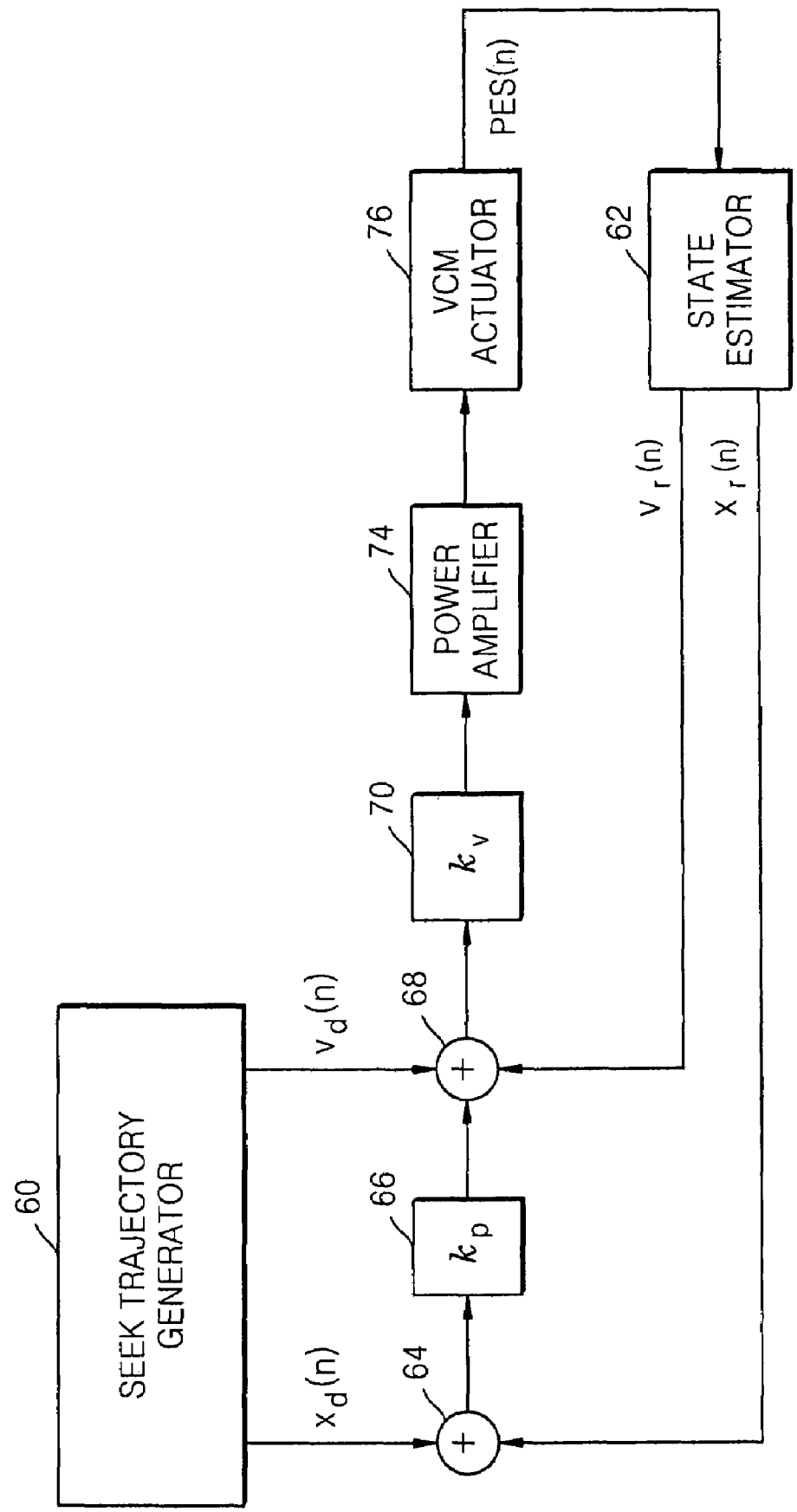
FIG. 3 is a block diagram of a servo control system of an HDD according to an embodiment of the present invention.

FIG. 3 is a block diagram of a track seek servo control system implemented using both hardware and software components. Those of ordinary skill in the art will recognize that various hardware, firmware, and/or software implementations are possible. In the illustrated embodiment, the track seek servo control system is controlled by controller 42.

Referring to FIG. 3, the track seek servo control system precisely positions head 16 over a target track on disk 12. In this regard, controller 42 executes a seek routine adapted to move head 16 from a current track to a new track located at a distance $X_{SK}$ from the current track. Gray code of one or more tracks located between the current track and the new track is read by head 16 while moving across the surface of disk 12. The read gray code is used by controller 42 to periodically determine the proximity of head 16 to the target track and monitor the movement speed of head 16 in relation to this proximity.

For example, the track seek servo control system may include a state estimator 62 implemented in hardware and software. State estimator 62 may be used to determine a real distance or position value $x_r(n)$ to which head 16 moves from the current track. The real distance value $x_r(n)$ may be determined by reading the gray code associated with a track just below head 16. State estimator 62 may also determine a real velocity value $v_r(n)$ for head 16. In order for controller 42 to correctly control the movement of head 16, the gray code can be periodically sampled as head 16 moves to the new track position.

A seek trajectory generator 60 may be sued to calculate a designed position value $x_d(n)$ and designed velocity value $v_d(n)$ for head 16 every time it updates gray code information for each track 34 being passed over between the current track and the target track.

A first subtracter 64 subtracts the real position value $x_r(n)$ from the designed position value $x_d(n)$. A position control gain compensator 66 generates a position compensation value by multiplying the difference between the real position value $x_r(n)$ and the designed position value $x_d(n)$ by a position gain $k_p$ for position compensation.

A second subtracter 68 subtracts the real velocity value $v_r(n)$ from a value obtained by adding the designed velocity value $v_d(n)$ to the position compensation value generated by position control gain compensator 66.

A velocity control gain compensator 70 generates a velocity compensation value by multiplying the difference between the real velocity value $v_r(n)$ and the designed velocity value $v_d(n)$, which is calculated by second subtracter 68, by a velocity gain $k_v$ for velocity compensation.

The velocity compensation value is amplified by a power amplifier 74 and applied to a VCM actuator 76. VCM actuator 76 varies the current supplied to voice coil 26 according to the amplified velocity compensation value in to eventually vary the movement of head 16.

Embodiments of the invention may be realized as a method, an apparatus, and/or a system. When an embodiment of the invention is realized in software, wholly or in part, the software components may be embodied as executable code segments stored in a memory accessible by a controller. For example, a program or executable code segments may be stored in a processor readable recording medium. The processor readable recording medium is any data storage device that can store or transmit data which can be thereafter read by a computer system. Examples of the processor readable recording medium include electronic circuits, semiconductor memory devices, read-only memory (ROM), flash memory, erasable ROM, floppy disks, optical discs, and hard disks.

As described above, according to embodiments of the present invention, by generating a new velocity trajectory which suppresses rapid current variations using a simple algorithm in a track seek control of a disk drive, noise and vibration can be reduced during seek operations performed in an HDD. Further, the time required to generate the velocity trajectory is markedly reduced. In addition, power consumption may be reduced according to a decrease in the time required to run required calculations.

While the present invention has been particularly shown and described with reference to exemplary embodiments thereof, it will be understood by those of ordinary skill in the art that various changes in form and detail may be made therein without departing from the scope of the present invention as defined by the following claims.

What is claimed is:

1. A method of controlling a track seek servo in a Hard Disk Drive (HDD), comprising:
    generating a velocity trajectory including a first portion in an acceleration duration below an initially established threshold velocity, a second portion in acceleration and deceleration durations above the initially established threshold velocity, and a third portion in a deceleration duration below the initially established threshold velocity, wherein the first portion is symmetrical to a velocity trajectory of a deceleration duration in a Proximate-Time Optimal Servo (PTOS) velocity trajectory, the second portion is generated in relation to a sine function, and the third portion is identical to the PTOS velocity trajectory in a deceleration duration; and,
    applying the generated velocity trajectory to control the movement of a read/write head from a current track to a target track.

2. The method of claim 1, wherein the generated velocity trajectory is characterized by a smoothed velocity curve including a transition point between the acceleration duration and the deceleration duration.

3. The method of claim 1, wherein the generated velocity trajectory is a transformed PTOS velocity trajectory V_profile generated by a controller executing code segments to implement the equations:
    (a) V_profile=symmetrical velocity trajectory of PTOS for intervals where Vcurr<Vth and sk_curr<sk_len/2;
    (b) V_profile=Vth+V sin for an interval where Vcurr≧Vth; and
    (c) V_profile=velocity trajectory of PTOS for intervals where Vcurr<Vth and ttg>sk_len/2,
    where Vcurr denotes a current seek velocity, Vth denotes a threshold velocity for determining a period during which the velocity trajectory is transformed to a smoothed velocity curve, sk_len denotes the total seek distance, sk_curr denotes a current seek point, and V sin denotes a velocity of a sine function.

4. The method of claim 3, wherein the HDD comprises a voice coil associated with a voice coil motor (VCM) have a torque constant and adapted to move an actuator on which the read/write head is mounted; and
    wherein a PTOS velocity trajectory V_ptos subjected to transformation is generated by operation of the controller executing the code segments to implement the equation:

$V\_ptos = \alpha * \{\beta * \log(1 - ttg/\beta) + ttg\}$, where, $\alpha = R*Ja/Kt^2$, $\beta = -Imax*R/Kt$, and where R denotes resistance of the voice coil, Ja denotes an inertia value for the actuator, Kt denotes the torque constant, Imax denotes a maximum current value applied to the VCM, and ttg denotes a seek distance.

5. The method of claim 3, wherein the HDD comprises a voice coil associated with a voice coil motor (VCM) having a torque constant and adapted to move an actuator on which the read/write head is mounted; and
    wherein a PTOS symmetrical velocity trajectory V_ptos(mir) is generated by operation of the controller executing the code segment to implement the equation:

$V\_ptos(mir) = \alpha * \{\beta * \log(1 - tta/\beta) + tta\}$ where, $\alpha = R*Ja/Kt^2$, $\beta = -Imax*R/Kt$, R denotes resistance for the voice coil, Ja denotes an inertia value for the actuator, Kt denotes the torque constant, Imax denotes a maximum current value applied to the voice coil motor (VCM), and tta denotes a seek distance.

6. The method of claim 3, wherein V sin=V max*sin (n*180/Nsample),
    where Nsample denotes a sine function interval between 0 and 180°, V max=A*(Vpeak−Vth), A denotes a constant having a value 0<A<1, and Vpeak denotes a peak velocity value.

7. The method of claim 6, wherein the value Nsample is determined in proportion to the seek distance.

8. An apparatus for controlling a track seek servo in a Hard Disk Drive (HDD), comprising:
    a seek trajectory generator adapted to generate a transformed Proximate-Time Optimal Servo (PTOS) velocity trajectory V_profile comprising; a first portion in an acceleration duration below an initially established threshold velocity, a second portion in acceleration and deceleration durations above the initially established threshold velocity, and a third portion in a deceleration duration below the initially established threshold velocity, wherein the first portion is symmetrical to a velocity trajectory of a deceleration duration in a PTOS velocity trajectory, the second portion is generated in relation to a sine function, and the third portion is identical to the PTOS velocity trajectory in a deceleration duration;
    a state estimator adapted to determine a real position value and a real velocity value for a read/write head moving over the surface of a disk in the HDD;
    a first subtracter adapted to output a value obtained by subtracting the real position value from the designed position value;
    a position control gain compensator adapted to generate a position compensation value by multiplying the output value of the first subtracter by a predetermined position gain;

a second subtracter adapted to output a value obtained by subtracting the real velocity value from a value obtained by adding the position compensation value to the designed velocity value;

a velocity control gain compensator adapted to generate a velocity compensation value by multiplying the output value of the second subtracter by a predetermined velocity gain; and an actuator adapted to vary drive current supplied to a voice coil in the HDD in accordance with the velocity compensation value.

9. The apparatus of claim 8, wherein the transformed Proximate-Time Optimal Servo (PTOS) velocity trajectory is characterized by a smoothed velocity curve over a defined period including a transition point between the acceleration duration and the deceleration duration.

10. The method of claim 9, wherein the transformed PTOS velocity trajectory V_profile is generated by a controller executing code segments to implement the equations:
(a) V_profile=symmetrical velocity trajectory of PTOS for intervals where Vcurr<Vth and sk_curr<sk_len/2;
(b) V_profile=Vth+V sin for an interval where Vcurr≧Vth; and
(c) V_profile=velocity trajectory of PTOS for intervals where Vcurr<Vth and ttg>sk_len/2,
where Vcurr denotes a current seek velocity, Vth denotes a threshold velocity for determining a period during which the velocity trajectory is transformed to a smoothed velocity curve, sk_len denotes the total seek distance, sk_curr denotes a current seek point, and V sin denotes a velocity of a sine function.

11. The method of claim 10, wherein the HDD comprises a voice coil associated with a voice coil motor (VCM) have a torque constant and adapted to move an actuator on which the read/write head is mounted; and
wherein a PTOS velocity trajectory V_ptos subjected to transformation is generated by operation of the controller executing the code segments to implement the equation:

$V\_ptos = \alpha * \{\beta * \log(1 - ttg/\beta) + ttg\}$, where, $\alpha = R*Ja/Kt^2$, $\beta = -Imax*R/Kt$, and where R denotes resistance of the voice coil, Ja denotes an inertia value for the actuator, Kt denotes the torque constant, Imax denotes a maximum current value applied to the VCM, and ttg denotes a seek distance.

12. The method of claim 10, wherein the HDD comprises a voice coil associated with a voice coil motor (VCM) having a torque constant and adapted to move an actuator on which the read/write head is mounted; and
wherein a PTOS symmetrical velocity trajectory V_ptos (mir) is generated by operation of the controller executing the code segment to implement the equation:

$V\_ptos(mir) = \alpha * \{\beta * \log(1 - tta/\beta) + tta\}$ where, $\alpha = R*Ja/Kt^2$, $\beta = -Imax*R/Kt$, R denotes resistance for the voice coil, Ja denotes an inertia value for the actuator, Kt denotes the torque constant, Imax denotes a maximum current value applied to the voice coil motor (VCM), and tta denotes a seek distance.

13. The method of claim 10, wherein V sin=V max*sin (n*180/Nsample),
where Nsample denotes a sine function interval between 0 and 180°, V max=A*(Vpeak−Vth), A denotes a constant having a value 0<A<1, and Vpeak denotes a peak velocity value.

14. The method of claim 13, wherein the value Nsample is determined in proportion to the seek distance.

15. A disk drive comprising:
a disk adapted to store data;
a spindle motor rotating the disk;
a read/write head adapted to read data from and/or write data to the disk;
an actuator adapted to move the transducer over the surface of the disk; and
a controller adapted to control movement of the read/write head from a current track to a target track in relation to a transformed Proximate-Time Optimal Servo (PTOS) velocity trajectory, wherein the PTOS velocity trajectory comprises a first portion in an acceleration duration below an initially established threshold velocity, a second portion in acceleration and deceleration durations above the initially established threshold velocity, and a third portion in a deceleration duration below the initially established threshold velocity, wherein the first portion is symmetrical to a velocity trajectory of a deceleration duration in a PTOS velocity trajectory, the second portion is generated in relation to a sine function, and the third portion is identical to the PTOS velocity trajectory in a deceleration duration.

16. The disk drive of claim 15, wherein the transformed PTOS velocity trajectory is characterized by a smoothed velocity curve over a defined period including a transition point between the acceleration duration and the deceleration duration.

17. The method of claim 15, wherein the transformed PTOS velocity trajectory V_profile is generated by a controller executing code segments to implement the equations:
(a) V_profile=symmetrical velocity trajectory of PTOS for intervals where Vcurr<Vth and sk_curr<sk_len/2;
(b) V_profile=Vth+V sin for an interval where Vcurr≧Vth; and
(c) V_profile=velocity trajectory of PTOS for intervals where Vcurr<Vth and ttg>sk_len/2,
where Vcurr denotes a current seek velocity, Vth denotes a threshold velocity for determining a period during which the velocity trajectory is transformed to a smoothed velocity curve, sk_len denotes the total seek distance, sk_curr denotes a current seek point, and V sin denotes a velocity of a sine function.

18. The method of claim 17, wherein the HDD comprises a voice coil associated with a voice coil motor (VCM) have a torque constant and adapted to move an actuator on which the read/write head is mounted; and
wherein a PTOS velocity trajectory V_ptos subjected to transformation is generated by operation of the controller executing the code segments to implement the equation:

$V\_ptos = \alpha * \{\beta * \log(1 - ttg/\beta) + ttg\}$, where, $\alpha = R*Ja/Kt^2$, $\beta = -Imax*R/Kt$, and where R denotes resistance of the voice coil, Ja denotes an inertia value for the actuator, Kt denotes the torque constant, Imax denotes a maximum current value applied to the VCM, and ttg denotes a seek distance.

19. The method of claim 17, wherein the HDD comprises a voice coil associated with a voice coil motor (VCM) having a torque constant and adapted to move an actuator on which the read/write head is mounted; and wherein a PTOS symmetrical velocity trajectory V_ptos (mir) is generated by operation of the controller executing the code segment to implement the equation:

$$V\_ptos(mir) = \alpha * \{\beta * \log(1 - tta/\beta) + tta\}$$

where, $\alpha = R*Ja/Kt^2$, $\beta = -Imax*R/Kt$, R denotes resistance for the voice coil, Ja denotes an inertia value for the actuator, Kt denotes the torque constant, Imax denotes a maximum current value applied to the voice coil motor (VCM), and tta denotes a seek distance.

20. The method of claim 17, wherein V sin=V max*sin (n*180/Nsample),
    where Nsample denotes a sine function interval between 0 and 180°, V max=A*(Vpeak−Vth), A denotes a constant having a value 0<A<1, and Vpeak denotes a peak velocity value.

21. Recording medium storing code segments executable on a controller to implement a method of controlling a track seek servo in a Hard Disk Drive (HDD), the method comprising:
    generating a velocity trajectory including a first portion in an acceleration duration below an initially established threshold velocity, a second portion in acceleration and deceleration durations above the initially established threshold velocity, and a third portion in a deceleration duration below the initially established threshold velocity, wherein the first portion is symmetrical to a velocity trajectory of a deceleration duration in a Proximate-Time Optimal Servo (PTOS) velocity trajectory, the second portion is generated in relation to a sine function, and the third portion is identical to the PTOS velocity trajectory in a deceleration duration; and,
    applying the transformed Proximate-Time Optimal Servo (PTOS) velocity trajectory to control the movement of a read/write head from a current track to a target track.

22. The method of claim 21, wherein the transformed PTOS velocity trajectory is characterized by a smoothed velocity curve including a transition point between the acceleration duration and the deceleration duration.

23. The method of claim 21, wherein the transformed PTOS velocity trajectory V_profile is generated by a controller executing code segments to implement the equations:
    (a) V_profile=symmetrical velocity trajectory of PTOS for intervals where Vcurr<Vth and sk_curr<sk_len/2;
    (b) V_profile=Vth+V sin for an interval where Vcurr≧Vth; and
    (c) V_profile=velocity trajectory of PTOS for intervals where Vcurr<Vth and ttg>sk_len/2,
    where Vcurr denotes a current seek velocity, Vth denotes a threshold velocity for determining a period during which the velocity trajectory is transformed to a smoothed velocity curve, sk_len denotes the total seek distance, sk_curr denotes a current seek point, and V sin denotes a velocity of a sine function.

24. The method of claim 23, wherein the HDD comprises a voice coil associated with a voice coil motor (VCM) have a torque constant and adapted to move an actuator on which the read/write head is mounted; and
    wherein a PTOS velocity trajectory V_ptos subjected to transformation is generated by operation of the controller executing the code segments to implement the equation:

$$V\_ptos = \alpha * \{\beta * \log(1 - ttg/\beta) + ttg\},$$

where, $\alpha = R*Ja/Kt^2$, $\beta = -Imax*R/Kt$, and where R denotes resistance of the voice coil, Ja denotes an inertia value for the actuator, Kt denotes the torque constant, Imax denotes a maximum current value applied to the VCM, and ttg denotes a seek distance.

25. The method of claim 23, wherein the HDD comprises a voice coil associated with a voice coil motor (VCM) having a torque constant and adapted to move an actuator on which the read/write head is mounted; and
    wherein a PTOS symmetrical velocity trajectory V_ptos (mir) is generated by operation of the controller executing the code segment to implement the equation:

$$V\_ptos(mir) = \alpha * \{\beta * \log(1 - tta/\beta) + tta\}$$

where, $\alpha = R*Ja/Kt^2$, $\beta = -Imax*R/Kt$, R denotes resistance for the voice coil, Ja denotes an inertia value for the actuator, Kt denotes the torque constant, Imax denotes a maximum current value applied to the voice coil motor (VCM), and tta denotes a seek distance.

26. The method of claim 23, wherein V sin=V max*sin (n*180/Nsample),
    where Nsample denotes a sine function interval between 0 and 180°, V max=A*(Vpeak−Vth), A denotes a constant having a value 0<A<1, and Vpeak denotes a peak velocity value.

* * * * *